United States Patent
Antony et al.

(10) Patent No.: US 12,299,021 B1
(45) Date of Patent: *May 13, 2025

(54) BI-DIRECTIONAL VOICE ENABLED SYSTEM FOR CPE DEVICES

(71) Applicant: CSC Holdings, LLC, Bethpage, NY (US)

(72) Inventors: Jaison P. Antony, Dix Hills, NY (US); Heitor J. Almeida, Elmsford, NY (US); John Markowski, Smithtown, NY (US); Peter Caramanica, Westbury, NY (US)

(73) Assignee: CSC Holdings, LLC, Bethpage, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 18/349,677

(22) Filed: Jul. 10, 2023

Related U.S. Application Data (63) Continuation of application No. 17/111,800, filed on Dec. 4, 2020, now Pat. No. 11,741,141, which is a
(Continued)

(51) Int. Cl.
*G10L 15/00* (2013.01)
*G06F 3/16* (2006.01)
(Continued)

(52) U.S. Cl.
CPC .......... *G06F 16/3344* (2019.01); *G06F 3/167* (2013.01); *G10L 15/22* (2013.01); *G10L 2015/225* (2013.01)

(58) Field of Classification Search
CPC .......... G10L 15/22; G10L 15/32; G06F 3/167
See application file for complete search history.

(56) References Cited

U.S. PATENT DOCUMENTS

9,305,064 B1 4/2016 LeBeau et al.
9,547,716 B2 1/2017 Kim
(Continued)

*Primary Examiner* — Daniel Abebe
(74) *Attorney, Agent, or Firm* — Sterne, Kessler, Goldstein & Fox P.L.L.C.

(57) ABSTRACT

The present disclosure describes a communication environment having a service provider server that receives an audio command from a display control device within the communication environment. The service provider server can translate this audio command into an electrical command for controlling the display device. The service provider server autonomously performs a specifically tailored search of a catalog of command words and/or phrases for the audio command to translate the audio command to the electrical command. This specifically tailored search can include one or more searching routines having various degrees of complexity. The most simplistic searching routine from among these searching routines represents a textual search to identify one or more command words and/or phrases from the catalog of command words and/or phrases that match the audio command. The one or more searching routines can include more complex searching routines, such as a keyword search and/or a natural language search, of the catalog of command words and/or phrases to identify one or more command words and/or phrases from the catalog of command words and/or phrases that match the audio command.

20 Claims, 5 Drawing Sheets

Related U.S. Application Data continuation of application No. 16/200,006, filed on Nov. 26, 2018, now Pat. No. 10,878,013.

(51) Int. Cl.
    *G06F 16/334*     (2025.01)
    *G10L 15/22*     (2006.01)

(56)     References Cited

U.S. PATENT DOCUMENTS

| | | | |
|---|---|---|---|
| 10,448,115 B1* | 10/2019 | Jamal | G10L 15/1815 |
| 10,878,013 B1 | 12/2020 | Antony et al. | |
| 11,360,736 B1 | 6/2022 | Borja Jaramillo et al. | |
| 2002/0188454 A1 | 12/2002 | Sauber | |
| 2005/0038650 A1 | 2/2005 | Bellegarda | |
| 2010/0286984 A1 | 11/2010 | Wandinger et al. | |
| 2013/0218572 A1* | 8/2013 | Cho | G10L 15/22 704/E21.001 |
| 2014/0066132 A1* | 3/2014 | Burke | H04L 67/12 455/569.2 |
| 2015/0025890 A1 | 1/2015 | Jagatheesan et al. | |
| 2015/0373393 A1* | 12/2015 | Lee | H04N 21/41265 704/275 |
| 2017/0169823 A1* | 6/2017 | Neff | G10L 15/30 |
| 2017/0264939 A1* | 9/2017 | Jang | H04N 21/4782 |
| 2017/0332128 A1* | 11/2017 | Jeong | H04M 1/72415 |
| 2019/0035404 A1 | 1/2019 | Gabel et al. | |
| 2020/0065342 A1 | 2/2020 | Panuganty | |

* cited by examiner

BI-DIRECTIONAL VOICE ENABLED SYSTEM FOR CPE DEVICES

RELATED APPLICATIONS

This application is a continuation and claims benefit of U.S. patent application Ser. No. 17/111,800 filed Dec. 4, 2020, which is a continuation and claims benefit of U.S. patent application Ser. No. 16/200,006 filed Nov. 26, 2018 and allowed as U.S. Pat. No. 10,878,013, the content of which are herein incorporated by references in their entireties.

BACKGROUND OF THE DISCLOSURE

Remote controls represent components within communication environments used to wirelessly operate display devices within the communication environments. Traditionally, conventional remote controls include arrays of buttons for controlling various operations, such as channel or volume to provide some examples, of the display devices. Recently, these conventional remote controls have become integrated with voice command control to allow more complicated operations to be performed using the human voice.

BRIEF DESCRIPTION OF THE DRAWINGS/FIGURES

The accompanying drawings, which are included to provide a further understanding of the disclosure and are incorporated in and constitute a part of this specification, illustrate exemplary embodiments. In the drawings.

The present disclosure will now be described with reference to the accompanying drawings. In the drawings, like reference numbers may indicate identical or functionally similar elements.

DETAILED DESCRIPTION OF THE DISCLOSURE

Overview

The present disclosure describes a communication environment having a service provider server that receives an audio command from a display control device within the communication environment. The service provider server can translate this audio command into an electrical command for controlling the display device. The service provider server autonomously performs a specifically tailored search of a catalog of command words and/or phrases for the audio command to translate the audio command to the electrical command. This specifically tailored search can include one or more searching routines having various degrees of complexity. The most simplistic searching routine from among these searching routines represents a textual search to identify one or more command words and/or phrases from the catalog of command words and/or phrases that match the audio command. The one or more searching routines can include more complex searching routines, such as a keyword search and/or a natural language search, of the catalog of command words and/or phrases to identify one or more command words and/or phrases from the catalog of command words and/or phrases that match the audio command.

Exemplary Communication Environment

Figure 1:
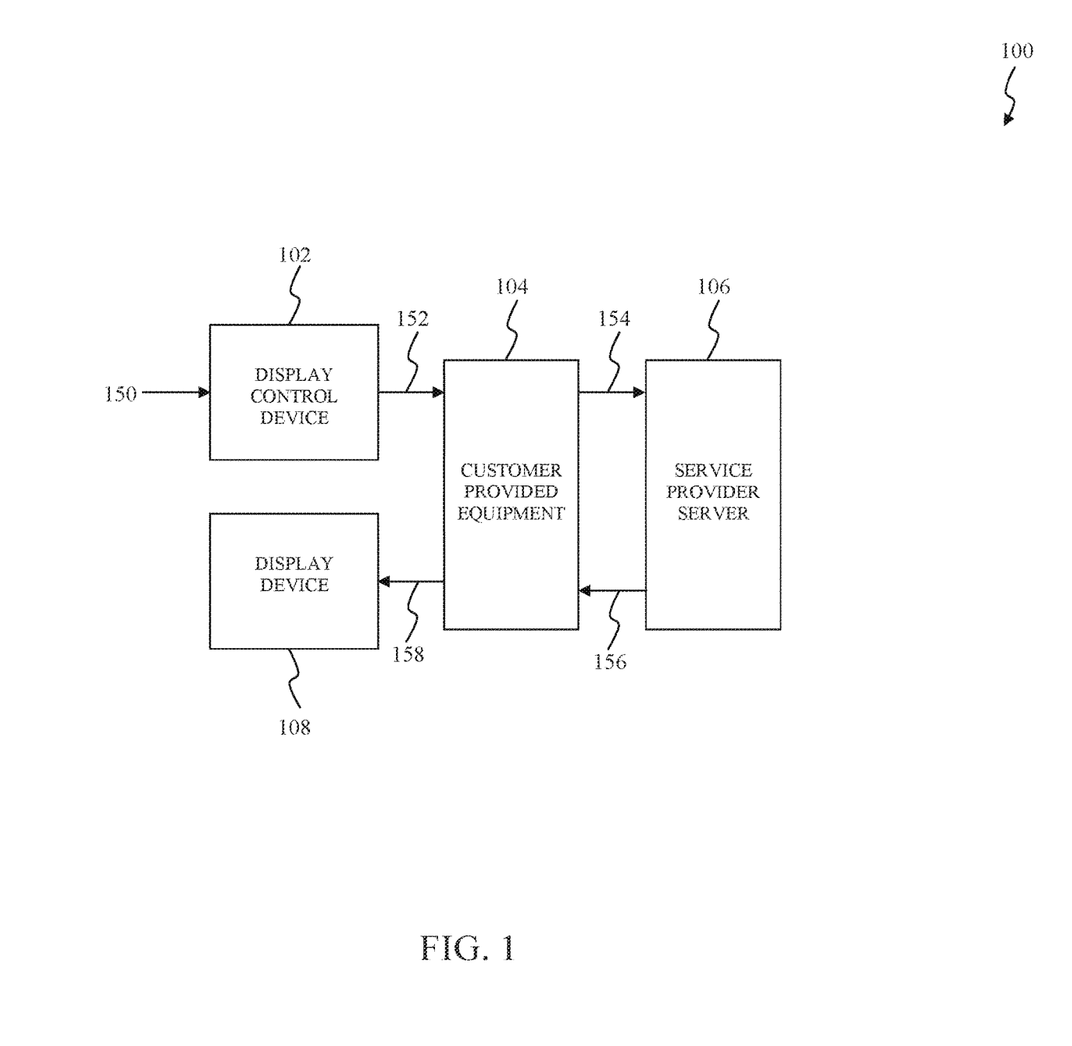
FIG. 1 illustrates a block diagram of an exemplary communication environment according to an embodiment of the present disclosure.

FIG. 1 illustrates a block diagram of an exemplary communication environment according to an embodiment of the present disclosure. As to be discussed in further detail below, a communication environment 100 receives an audio command, such as a voice command from a user, to control a display device within the communication environment 100 and translates this audio command into an electrical command for controlling the display device. In some situations, the communication environment 100 autonomously performs a specifically tailored search, such as a keyword search or a natural language search, on the audio command to translate the audio command to the electrical command. In the exemplary embodiment illustrated in FIG. 1, the communication environment 100 includes a display control device 102, a customer provided equipment (CPE) 104, a service provider server 106, and display device 108.

The display control device 102 receives an audio command 150, such as the voice command from the user, to control the display device 108. In the exemplary embodiment illustrated in FIG. 1, the audio command 150 represents an audible voice command that is spoken by the user to the display control device 102. In some situations, the audio command 150 can be a direct audio command to directly control operation of the display device 108 or an indirect audio command that requires additional processing to control operation of the display device 108. The direct audio command can include one or more commands, such as "volume up," "volume down," "channel up," "channel down," "closed-captioning on," and/or "closed-captioning off" to provide some examples, which directly control operation of the display device 108. The indirect audio command can include one or more commands, such as "watch <movie name>," "watch <programming channel name>," "play <application name>," and/or "search <search term>" to provide some examples, which indirectly control operation of the display device 108 through additional processing by the service provider server 106. However, these examples for the direct audio command and the indirect audio command above are for exemplary purposes only. Those skilled in the relevant art(s) will recognize the direct audio command and the indirect audio command can differ from the examples above without departing from the spirit and scope of the present disclosure. In the exemplary embodiment illustrated in FIG. 1, the display control device 102 can convert the audio command 150 from the audible voice command in an analog signal domain to a digital audio command 152 in a digital signal domain. In some situations, the display control device 102 can additionally modulate the digital audio command 152 for wireless delivery to the CPE 104.

The CPE 104 receives the digital audio command 152 from the display control device 102. In the exemplary embodiment illustrated in FIG. 1, the CPE 104 can append identifying information to uniquely identify a source of the digital audio command 152, for example, the CPE 104, the display control device 102, or the user of the display control device 102, onto the digital audio command 152. This identifying information can include a unique identifier of the display control device 102 or the CPE 104, such as a manufacturer serial number, a media access control (MAC) number, and/or an Internet Protocol (IP) address and/or a username associated the user of the display control device 102 to provide some examples. The CPE 104 can append the identifying information onto the digital audio command 152 as a header then packetize the header and the digital audio command 152 as a digital audio command 154 for delivery to the service provider server 106. As illustrated in FIG. 1, the CPE 104 additionally receives a digital electrical command 156 from the service provider server 106. The digital electrical command 156 is to be described in further detail below. In the exemplary embodiment illustrated in FIG. 1, the CPE 104 can append identifying information to uniquely identify a destination of the digital electrical command 156, for example, the display device 108, onto the digital audio command 152. This identifying information can include a unique identifier of the display device 108, such as a manufacturer serial number, a media access control (MAC) number, and/or an Internet Protocol (IP) address to provide some examples. The CPE 104 can append the identifying information onto the digital electrical command 156 as a header then packetize the header and the digital electrical command 156 as a digital electrical command 158 for delivery to the display device 108.

The service provider server 106 determines the digital electrical command 156 to control the display device 108 based on the digital audio command 154. In the exemplary embodiment illustrated in FIG. 1, the service provider server 106 autonomously performs a specifically tailored search to translate the digital audio command 154 to the digital electrical command 156. For example, the digital audio command 154 can correspond to the direct audio command, such as "volume up," "volume down," "channel up," "channel down," "closed-captioning on," and/or "closed-captioning off" to provide some examples as described above, to directly control operation of the display device 108 and/or the indirect audio command, such as "watch <movie name>," "watch <programming channel name>," "play <application name>," and/or "search <search term>" to provide some examples as described above, to indirectly control operation of the display device 108. In this example, the service provider server 106 can store a catalog of command words and/or phrases with each of the command words and/or phrases being associated with one or more electrical commands to control operation of the display device 108. In an exemplary embodiment, the catalog of command words and/or phrases can represent a media catalog outlining various characteristics, attributes, and/or parameters for various media being broadcast. These characteristics, attributes, and/or parameters can include, media name, schedule or playing times, channel name(s), channel number(s), playing format (for example, High Definition, Standard definition), and/or language for the various media being broadcast. In another exemplary embodiment, the catalog of command words and/or phrases can be specifically tailored in accordance with one or more attributes and/or characteristics of the user, such as geographical locations, entitlements, language, preferences, or other similar information to provide some examples.

The specifically tailored search autonomously performed by the service provider server 106 to translate the digital audio command 154 to the digital electrical command 156 can include one or more searching routines having various degrees of complexity. The most simplistic searching routine from among these searching routines represents a textual search of the catalog of command words and/or phrases to identify one or more command words and/or phrases that match the digital audio command 154. As to be described in further detail below, the one or more searching routines can include more complex searching routines, such as any suitable keyword search that will be apparent to those skilled in the relevant art(s) without departing from the spirit and scope of the present disclosure and/or any suitable natural language search that will be apparent to those skilled in the relevant art(s) without departing from the spirit and scope of the present disclosure to provide some examples, of the digital audio command 154 to translate the digital audio command 154 to the digital electrical command 156.

In the exemplary embodiment illustrated in FIG. 1, the service provider server 106 can append identifying information onto the digital electrical command 156 to uniquely identify a destination of the digital electrical command 156, for example, the CPE 104 and/or the display device 108 to provide some examples. This identifying information can include a unique identifier of the display control device 102 or of the CPE 104, such as a manufacturer serial number, a media access control (MAC) number, and/or an Internet Protocol (IP) address to provide some examples. The service provider server 106 can append the identifying information onto the digital electrical command 156 as a header then packetize the digital electrical command 156 for delivery to the CPE 104.

The display device 108 performs one or more operations in accordance with the digital electrical command 158. For example, the one or more operations can include operations corresponding to the direct audio command, such as "volume up," "volume down," "channel up," "channel down," "closed-captioning on," and/or "closed-captioning off" to provide some examples as described above, which directly control operation of the display device 108. The one or more operations can alternatively, or additionally, include operations corresponding to the indirect audio command, such as "watch <movie name>," "watch <programming channel name>," "play <application name>," and/or "search <search term>" to provide some examples as described above. The one or more operations may include operations such as "volume up," "volume down," "channel up," "channel down," "closed-captioning on," "closed-captioning off," "tune to <channel number>," "run <application>," "display <message>," and/or "display <search result>" as examples. Although the display control device 102 and the display device 108 are illustrated as being separate electronic devices in FIG. 1, this is for illustrative purposes only. Those skilled in the relevant art(s) will recognize the display control device 102 and the display device 108 can be integrated within a single electronic device, such as a tablet computer or mobile phone to provide some examples, without departing from the spirit and scope of the present disclosure.

Figure 2:
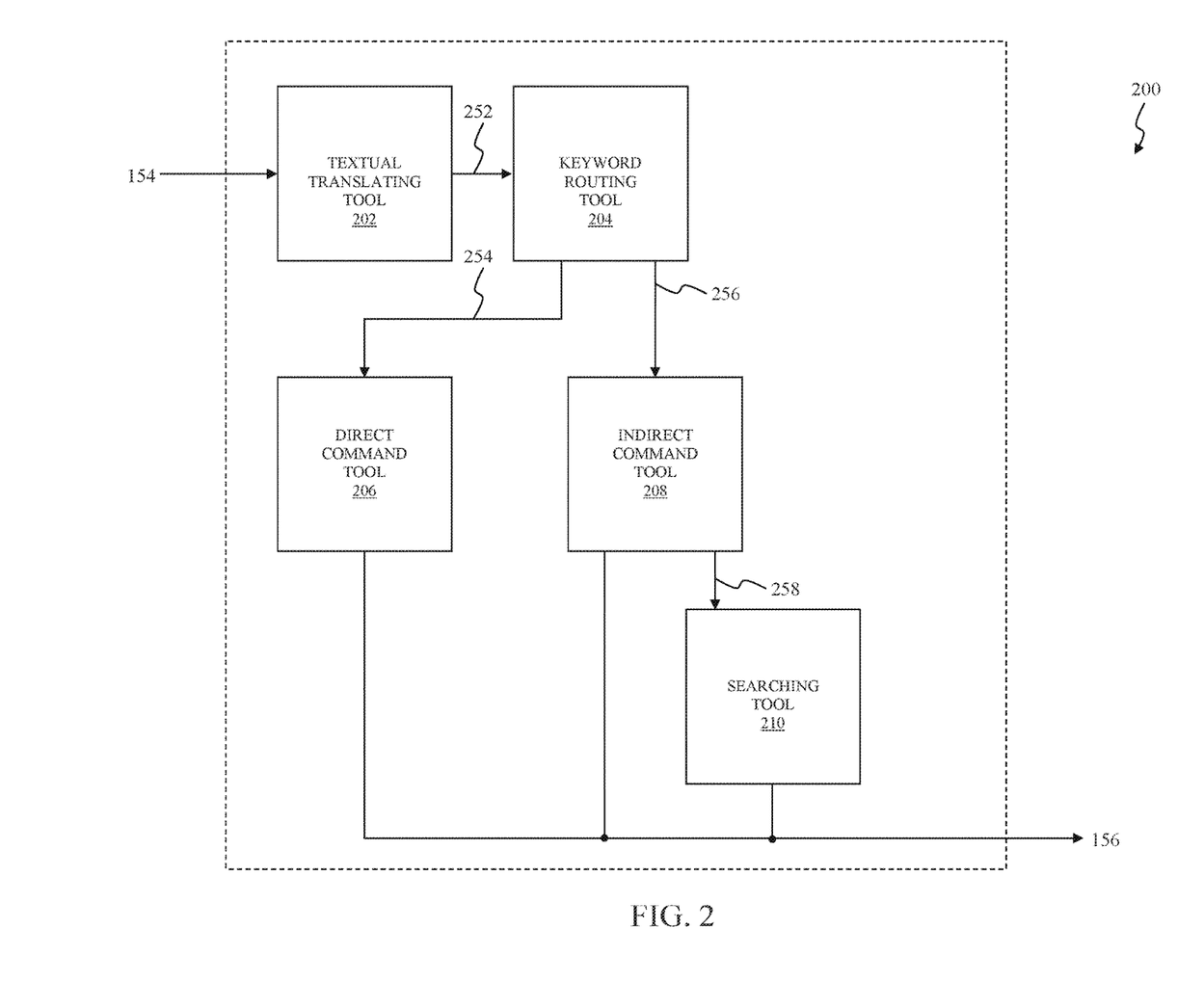
FIG. 2 illustrates a block diagram of an exemplary service provider server that can be implemented within the exemplary communication environment according to an exemplary embodiment of the present disclosure.

Exemplary Service Provider Server that can be Implemented within the Exemplary Communication Environment FIG. 2 illustrates a block diagram of an exemplary service provider server that can be implemented within the exemplary communication environment according to an exemplary embodiment of the present disclosure. As to be discussed in further detail below, a service provider server 200 translates the digital audio command 154 into the digital electrical command 156 for controlling the display device. As illustrated in FIG. 2, the service provider server 200 includes a textual translating tool 202, a keyword routing tool 204, a direct command tool 206, an indirect command tool 208, and a searching tool 210. The service provider server 200 can represent an exemplary embodiment of the service provider server 106 as described above in FIG. 1. These various tools, which to be described in further detail below, represent one or more electronic software tools, that when executed by one or more computing devices, processors, controllers, or other devices that will be apparent to those skilled in the relevant art(s) without departing from the spirit and scope of the present disclosure, can translate the digital audio command 154 into the digital electrical command 156. Further, these various tools may be described herein as performing certain actions. However, it should be appreciated that such descriptions are merely for convenience and that such actions in fact result from computing devices, processors, controllers, or other devices executing these various tools.

The textual translating tool 202 analyzes and/or processes the digital audio command 154 to identify one or more textual words and/or phrases 252 present within the digital audio command 154. In the exemplary embodiment illustrated in FIG. 2, the textual translating tool 202 can use an automatic speech recognition (ASR), a computer speech recognition or a speech to text (STT) recognition to translate the digital audio command 154 into the one or more textual words and/or phrases 252. For example, the digital audio command 154 can correspond to the direct audio command, such as "volume up" to provide an example. In this example, the textual translating tool 202 identifies the textual words "volume" and "up" from the digital audio command 154 and provides the textual words "volume" and "up" as the one or more textual words and/or phrases 252. As another example, the digital audio command 154 can correspond to the indirect audio command, such as "watch <movie name>" to provide an example. In this other example, the textual translating tool 202 identifies the textual word "watch" and the textual word and/or phrase "<movie name>" from the digital audio command 154 and provides the textual word "watch" and the textual word and/or phrase "<movie name>" as the one or more textual words and/or phrases 252.

The keyword routing tool 204 categorizes the textual words and/or phrases 252 into one or more audio command classifications from among multiple possible audio command classifications. In the exemplary embodiment illustrated in FIG. 2, the keyword routing tool 204 analyzes the textual words and/or phrases 252 to determine a grammatical metric for the textual words and/or phrases 252. This grammatical metric can include the number of elemental concepts within the textual words and/or phrases 252 and the intent of the textual words and/or phrases 252 to provide an example. In the exemplary embodiment illustrated in FIG. 2, the service provider server 200 processes the multiple possible audio command classifications differently from each other as to be described in further detail below. In an exemplary embodiment, the keyword routing tool 204 categorizes the textual words and/or phrases 252 as being direct audio command textual words and/or phrases 254 or indirect audio command textual words and/or phrases 256. In the exemplary embodiment illustrated in FIG. 2, the keyword routing tool 204 can route the direct audio command textual words and/or phrases 254 to the direct command tool 206 for further processing and/or the indirect audio command textual words and/or phrases 256 to the indirect command tool 208 for further processing.

In the exemplary embodiment illustrated in FIG. 2, the direct command tool 206 analyzes the direct audio command textual words and/or phrases 254 to determine the digital electrical command 156. As described above, the direct audio commands can include "volume up," "volume down," "channel up," "channel down," "closed-captioning on," and/or "closed-captioning off" to provide some examples. The direct command tool 206 can perform a textual search of the catalog of command words and/or phrases to identify command words and/or phrases that match the direct audio command textual words and/or phrases 254. The direct command tool 206 can provide the corresponding electrical command associated with the command words and/or phrases that match the direct audio command textual words and/or phrases 254 as the digital electrical command 156. From the example above, the direct command tool 206 can perform a textual search for the direct audio command "volume up" within the catalog of command words and/or phrases. In this example, the direct command tool 206 can provide the corresponding electrical command associated with the command words and/or phrases that match the direct audio command "volume up" as the digital electrical command 156.

As illustrated in FIG. 2, the indirect command tool 208 analyzes the indirect audio command textual words and/or phrases 256 to determine the digital electrical command 156. As described above, the indirect audio commands can include "watch <movie name>," "watch <programming channel name>," "play <application name>," and/or "search <search term>" to provide some examples. The indirect command tool 208 and/or searching tool 210, to be described in further detail below, can autonomously perform the specifically tailored having one or more searching routines having various degrees of complexity as described above in FIG. 1 on the indirect audio command textual words and/or phrases 256 to determine the digital electrical command 156. The indirect command tool 208 can perform a textual search of the catalog of command words and/or phrases to identify command words and/or phrases that match the indirect audio command textual words and/or phrases 256. The indirect command tool 208 can provide the corresponding electrical command associated with the command words and/or phrases that match the indirect audio command as the digital electrical command 156. From the example above, the indirect command tool 208 can perform a textual search of the catalog of command words and/or phrases to identify command words and/or phrases that match the indirect audio command "watch <movie name>" and can provide the corresponding electrical command associated with the command words and/or phrases that match the indirect audio command "watch <movie name>" as the digital electrical command 156. Alternatively, or in addition to, the indirect command tool 208 can provide indirect audio command textual words and/or phrases 256 to the searching tool 210 as one or more audio command search terms 258 to perform more complex searching routines.

The searching tool 210 performs the more complex searching routines, such as the natural language search and/or the keyword search to provide some examples, of the one or more audio command search terms 258 to translate the digital audio command 154 to the digital electrical command 156. Although the searching tool 210 is implemented as within the service provider server 200 in FIG. 2, this is for illustrative purposes only. In some situations, the searching tool 210 can be maintained and/or operated by a third party without departing from the spirit and scope of the present disclosure. In the exemplary embodiment illustrated in FIG. 2, the searching tool 210 analyzes the one or more audio command search terms 258 to determine a grammatical metric for the one or more audio command search terms 258. This grammatical metric can include the number of elemental concepts within the one or more audio command search terms 258 and/or the number of textual words and/or phrases within the one or more audio command search terms 258 to provide some examples. Thereafter, the searching tool 210 can compare the grammatical metric to a search threshold. When the grammatical metric is less than or equal to the search threshold, the searching tool 210 can perform the keyword search on the one or more audio command search terms 258 to translate the digital audio command 154 to the digital electrical command 156. In an exemplary embodiment, the searching tool 210, when performing the keyword search, can remove one or more connecting words, for example, "the," "or," and/or "and," from the one or more audio command search terms 258. In this exemplary embodiment, the searching tool 210 can perform any suitable keyword search that will be apparent to those skilled in the relevant art(s) without departing from the spirit and scope of the present disclosure of the catalog of command words and/or phrases to identify command words and/or phrases that match the one or more audio command search terms 258 without the one or more connecting words. Thereafter, the searching tool 210 can provide the corresponding electrical command associated with the command words and/or phrases that match the one or more audio command search terms 258 without the one or more connecting words as the digital electrical command 156. Otherwise, when the grammatical metric is greater than the search threshold, the searching tool 210 can perform the natural language search on the one or more audio command search terms 258 to translate the digital audio command 154 to the digital electrical command 156. In an exemplary embodiment, the searching tool 210, when performing the natural language search, determines one or more elemental concepts within the one or more audio command search terms 258 based upon their position within the one or more audio command search terms 258. In this exemplary embodiment, the searching tool 210 can perform any suitable natural language search that will be apparent to those skilled in the relevant art(s) without departing from the spirit and scope of the present disclosure of the catalog of command words and/or phrases to identify command words and/or phrases that match the one or more elemental concepts. Thereafter, the searching tool 210 can provide the corresponding electrical command associated with the command words and/or phrases that match the one or more elemental concepts as the digital electrical command 156.

Figure 3:
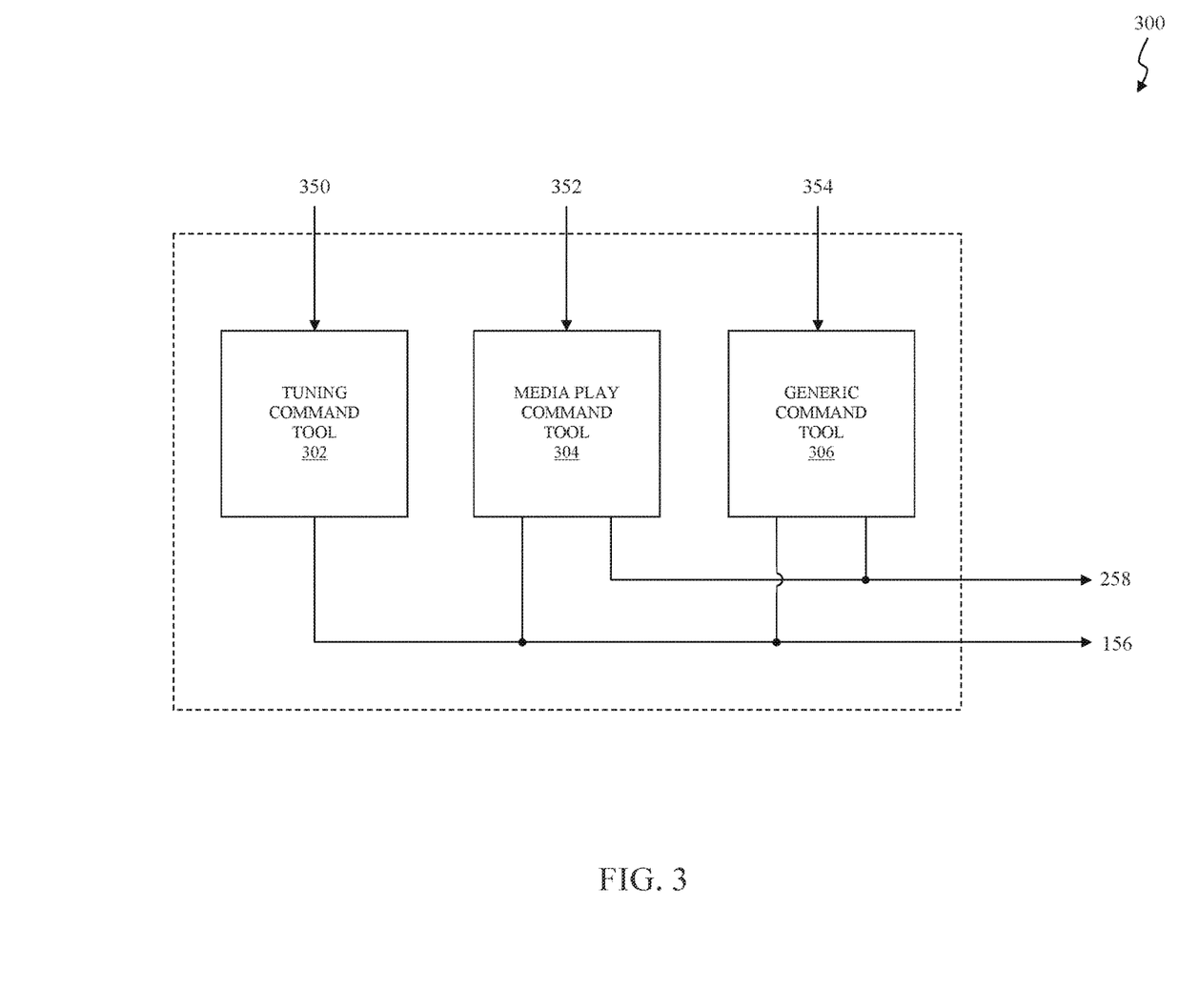
FIG. 3 illustrates a block diagram of an exemplary indirect command tool that can be implemented within the exemplary service provider server according to an exemplary embodiment of the present disclosure.

Exemplary Indirect Command Tool that can be Implemented within the Exemplary Service Provider Server FIG. 3 illustrates a block diagram of an exemplary indirect command tool that can be implemented within the exemplary service provider server according to an exemplary embodiment of the present disclosure. As described above, an exemplary service provider server, such as the service provider server 200 to provide an example, categorizes the digital audio command 154 as being direct audio command textual words and/or phrases or indirect audio command textual words and/or phrases. In the exemplary embodiment illustrated in FIG. 3, the indirect audio command textual words and/or phrases can include tuning command textual words and/or phrases 350, media play command textual words and/or phrases 352, and/or generic command textual words and/or phrases 354. As to be discussed in further detail below, an indirect command tool 300 analyzes the tuning command textual words and/or phrases 350, the media play command textual words and/or phrases 352, and/or the generic command textual words and/or phrases 354 to determine the digital electrical command 156. As illustrated in FIG. 3, the indirect command tool 300 includes a tuning command tool 302, a media play command tool 304, and a generic command tool 306. The indirect command tool 300 can represent an exemplary embodiment of the indirect command tool 208 as described above in FIG. 2.

The tuning command tool 302 analyzes the tuning command textual words and/or phrases 350 to determine the digital electrical command 156 in a substantially similar manner as the indirect command tool 208 as described above in FIG. 2. Generally, the tuning command textual words and/or phrases 350 relate to tuning the display device 108 to different broadcast channels offered by the service provider server 106. For example, the tuning command textual words and/or phrases 350 can include the indirect audio command "watch <programming channel name>". In this example, the tuning command tool 302 separates the indirect audio commands "watch <programming channel name>" into elemental concepts "watch" and "<programming channel name>." Thereafter, the tuning command tool 302 can perform a textual search of the catalog of command words and/or phrases to identify the programming channel number that matches the "<programming channel name>". As described above in FIG. 1, the catalog of command words and/or phrases can be specifically tailored in accordance with one or more attributes and/or characteristics of the user, such as geographical locations, entitlements, language, preferences, or other similar information to provide some examples. For example, the catalog of command words and/or phrases may map the "<programming channel name>" to a first programming channel number when viewed in a first geographic location or to a second programming channel number when viewed in a second geographic location. Thereafter, the tuning command tool 302 generates the digital electrical command 156 to tune the CPE 104 to the programming channel number which corresponds to the "<programming channel name>".

The media play command tool 304 analyzes the media play command textual words and/or phrases 352 to determine the digital electrical command 156 in a substantially similar manner as the indirect command tool 208 as described above in FIG. 2. Generally, the media play command textual words and/or phrases 352 relate to requesting media content, such as audio or video to provide some examples, offered by the service provider server 106. For example, the media play command textual words and/or phrases 352 can include the indirect audio command "watch <movie name>". In this example, the media play command tool 304 separates the indirect audio commands "watch <movie name>" into elemental concepts "watch" and "<movie name>." Thereafter, the media play command tool 304 can perform a textual search of the catalog of command words and/or phrases to identify the media which corresponds to the "<movie name>". As described above in FIG. 1, the catalog of command words and/or phrases can represent a media catalog outlining various characteristics, attributes, and/or parameters for various media being broadcast. This media catalog outlines various characteristics, attributes, and/or parameters for various media (e.g. the movie <movie name>) being broadcast. These characteristics, attributes, and/or parameters can include, media name, schedule or playing times, channel name(s), channel number(s), playing format (for example, High Definition, Standard definition), and/or language for the various media being broadcast. Thereafter, the media play tool 304 generates the digital electrical command 156 to play the media in accordance with the catalog of command words and/or phrases. For example, the media play tool 304 generates the digital electrical command 156 to tune to a channel as outlined the media catalog to play the requested media when the requested media is playing at the time of request. As another example, the media play tool 304 generates the digital electrical command 156 to record the media in accordance with the media catalog when the requested media is within the media catalog but not playing at the time of request. In some situations, the media play command tool 304 can provide the media play command textual words and/or phrases 352 to the searching tool 210 as the one or more audio command search terms 258 to allow the searching tool 210 to performs the more complex searching routines, such as the natural language search and/or the keyword search to provide some examples, of the media play command textual words and/or phrases 352 as described above in FIG. 2.

The generic command tool 306 analyzes the generic command textual words and/or phrases 354 to determine the digital electrical command 156 in a substantially similar manner as the indirect command tool 208 as described above in FIG. 2. Generally, the generic command textual words and/or phrases 354 relate to requesting execution of a software application, such as general search, running an application, and/or playing a game to provide some examples. For example, the generic command textual words and/or phrases 354 can include the indirect audio command "play <application name>". In this example, the generic command tool 306 separates the indirect audio commands "play <application name>" into elemental concepts "play" and "<application name>." Thereafter, the generic command tool 306 can perform a textual search of the catalog of command words and/or phrases to identify the application which corresponds to the "<application name>". Thereafter, the media play tool 304 generates the digital electrical command 156 to execute the application in accordance with the catalog of command words and/or phrases. In some situations, the generic command tool 306 can provide the generic command textual words and/or phrases 354 to the searching tool 210 as the one or more audio command search terms 258 to allow the searching tool 210 to performs the more complex searching routines, such as the natural language search and/or the keyword search to provide some examples, of the generic command textual words and/or phrases 354 as described above in FIG. 2.

Exemplary Operational Control Flow for the Exemplary Communication Environment

Figure 4:
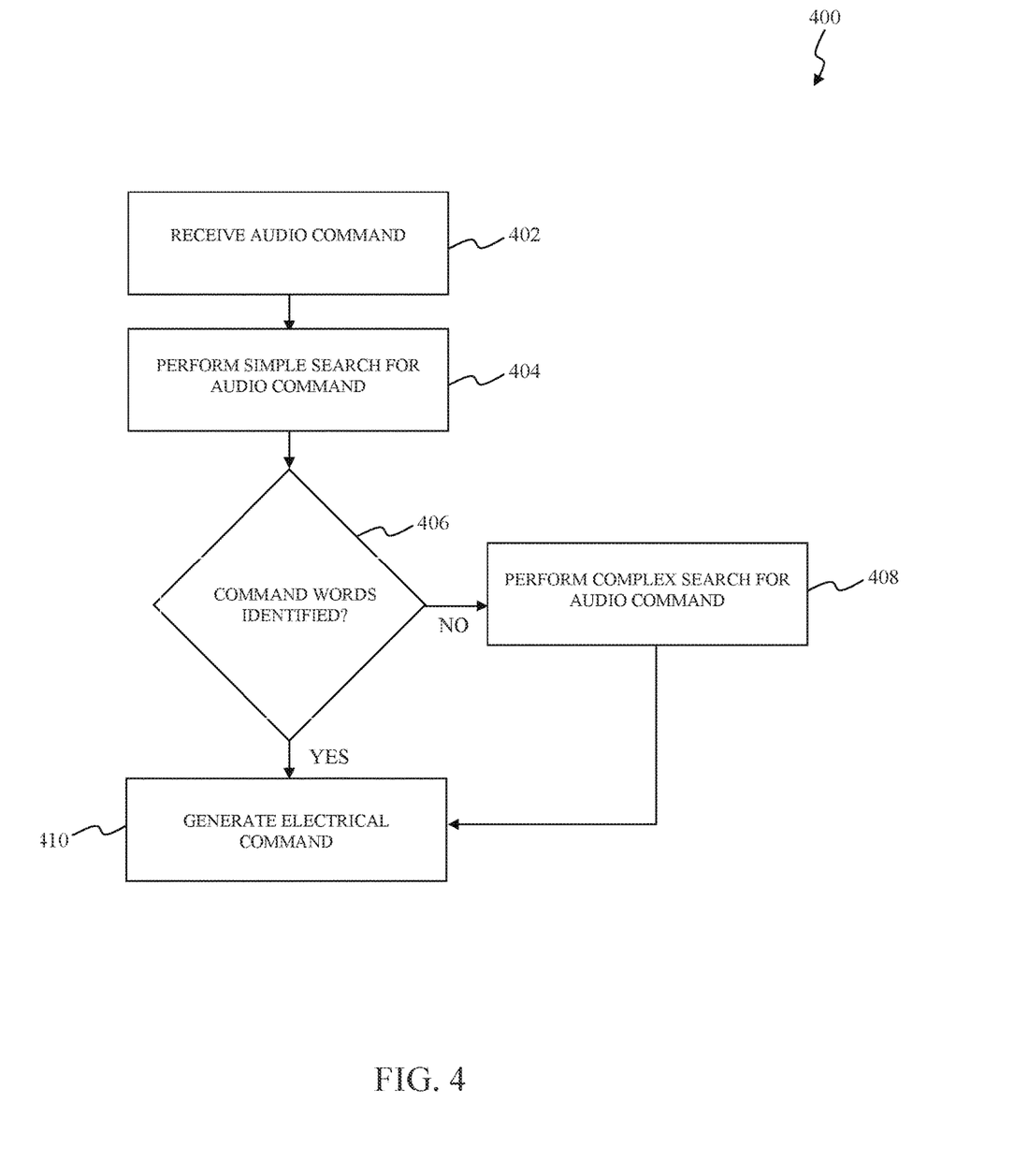
FIG. 4 illustrates a flowchart of exemplary operations for the exemplary communication environment according to an exemplary embodiment of the present disclosure.

FIG. 4 illustrates a flowchart of exemplary operations for the exemplary communication environment according to an exemplary embodiment of the present disclosure. The disclosure is not limited to this operational description. Rather, it will be apparent to ordinary persons skilled in the relevant art(s) that other operational control flows are within the scope and spirit of the present disclosure. The following discussion describes an exemplary operational control flow 400 for an exemplary communication environment, such as the exemplary communication environment 100 as described above in FIG. 1, to translate an audio command into an electrical command for controlling a display device.

At operation 402, the exemplary operational control flow 400 receives an audio command, such as the voice command from the user, to control a display device, such as the display device 108. The audio command represents an audible voice command that is spoken by the user to a display control device, such as the display control device 102. In some situations, the audio command can be a direct audio command to directly control operation of the display device or an indirect audio command that requires additional processing to control operation of the display device. The direct audio command can include one or more commands, such as "volume up," "volume down," "channel up," "channel down," "closed-captioning on," and/or "closed-captioning off" to provide some examples, which directly control operation of the display device. The indirect audio command can include one or more commands, such as "watch <movie name>," "watch <programming channel name>," "play <application name>," and/or "search <search term>" to provide some examples, which indirectly control operation of the display device through additional processing.

At operation 404, the exemplary operational control flow 400 performs a simple search of a catalog of command words and/or phrases for the audio command from operation 402. The exemplary operational control flow 400 can perform a textual search of a catalog of command words and/or phrases to identify command words and/or phrases that match the audio command from operation 402. As described above, the audio command from operation 402 can include "volume up," "volume down," "channel up," "channel down," "closed-captioning on," "closed-captioning off," "watch <movie name>," "watch <programming channel name>," "play <application name>," and/or "search <search term>" to provide some examples. The exemplary operational control flow 400 can perform a textual search of a catalog of command words and/or phrases to identify command words and/or phrases that match "volume up," "volume down," "channel up," "channel down," "closed-captioning on," "closed-captioning off," "watch <movie name>," "watch <programming channel name>," "play <application name>," and/or "search <search term>"

At operation 406, the exemplary operational control flow 400 determines whether the one or more command words and/or phrases matching the audio command from operation 402 have been identified. The exemplary operational control flow 400 proceeds to operation 408 when the one or more command words and/or phrases matching the audio command from operation 402 have not been identified. Otherwise, the exemplary operational control flow 400 proceeds to operation 410 when the one or more command words and/or phrases matching the audio command from operation 402 have been identified.

At operation 408, the exemplary operational control flow 400 performs more complex searching, such as any suitable keyword search that will be apparent to those skilled in the relevant art(s) without departing from the spirit and scope of the present disclosure and/or any suitable natural language search that will be apparent to those skilled in the relevant art(s) without departing from the spirit and scope of the present disclosure to provide some examples, on the audio command from operation 402 to identify one or more command words and/or phrases that match the audio command from the catalog of command words and/or phrases. The exemplary operational control flow 400 analyzes the audio command from operation 402 to determine a grammatical metric for the audio command from operation 402. This grammatical metric can include the number of elemental concepts within the audio command from operation 402 and/or the number of textual words and/or phrases within the audio command from operation 402 to provide some examples. When the grammatical metric is less than or equal to a search threshold, the exemplary operational control flow 400 can perform the keyword search on the audio command from operation 402. Otherwise, when the grammatical metric is greater than the search threshold, the exemplary operational control flow 400 can perform the natural language search on the audio command from operation 402.

At operation 410, the exemplary operational control flow 400 generates an electrical command, such as the digital electrical command 156, from the one or more command words and/or phrases identified in operation 404 and/or operation 408 to control the display device in accordance with the audio command from operation 402.

Exemplary Computer System for Implementing the Exemplary Design Environment

Figure 5:
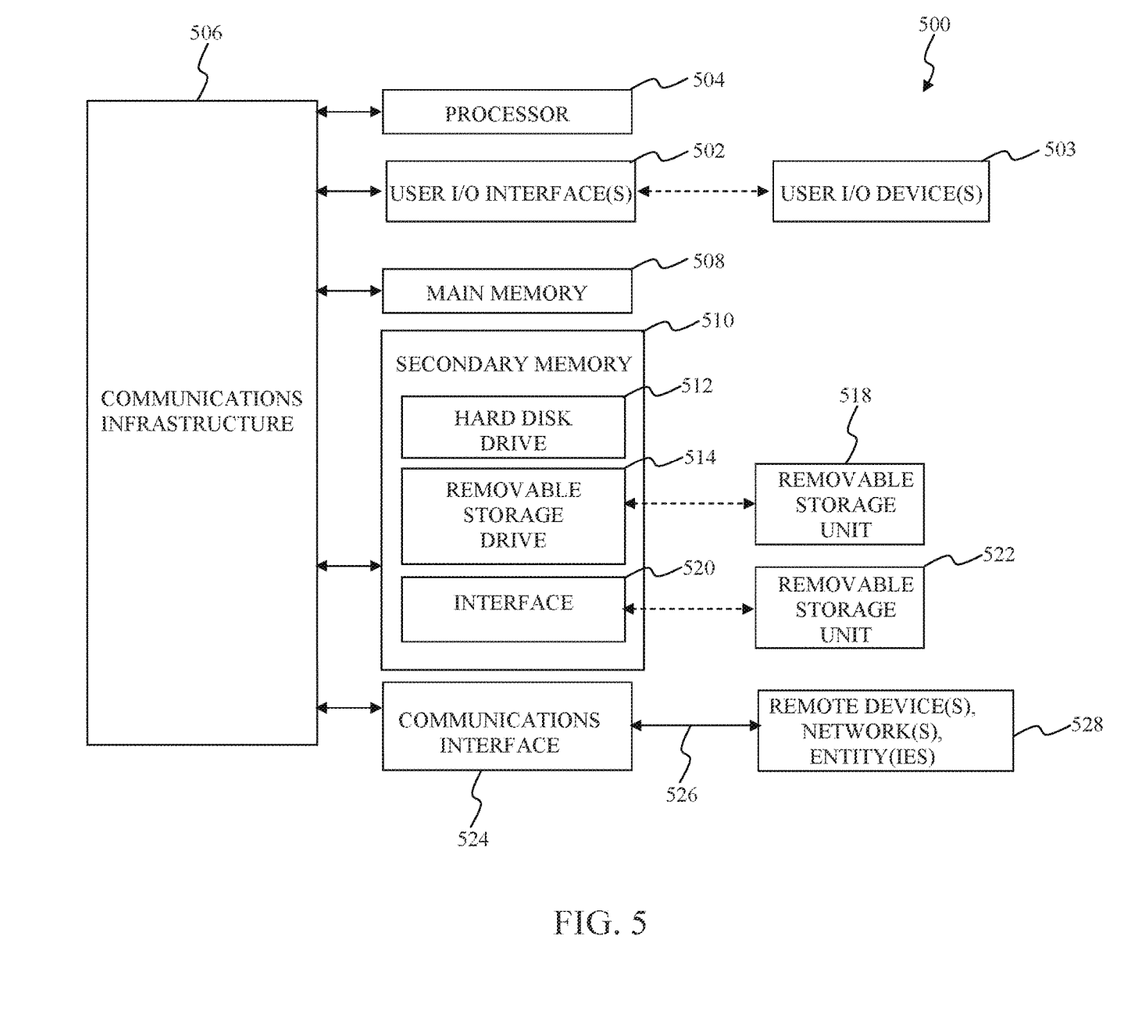
FIG. 5 illustrates a block diagram of an exemplary computer system for implementing the exemplary design environment according to an exemplary embodiment of the present disclosure.

FIG. 5 illustrates a block diagram of an exemplary computer system for implementing the exemplary design environment according to an exemplary embodiment of the present disclosure. A computer system 500 can be used to implement the communication environment 100. However, in some situations, more than one computer system 500 can be used to implement the communication environment 100. After reading this description, it will become apparent to a person skilled in the relevant art how to implement embodiments using other computer systems and/or computer architectures.

The computer system 500 includes one or more processors 504, also referred to as central processing units, or CPUs, to execute the textual translating tool 202, the keyword routing tool 204, the direct command tool 206, the indirect command tool 208, and the searching tool 210 as described above in FIG. 2 and/or the tuning command tool 302, the media play command tool 304, and the generic command tool 306 as described above in FIG. 3. The one or more processors 504 can be connected to a communication infrastructure or bus 506. In an exemplary embodiment, one or more of the one or more processors 504 can be implemented as a graphics processing unit (GPU). The GPU represents a specialized electronic circuit designed to rapidly process mathematically intensive applications on electronic devices. The GPU may have a highly parallel structure that is efficient for parallel processing of large blocks of data, such as mathematically intensive data common to computer graphics applications, images and videos.

The computer system 500 also includes user input/output device(s) 503, such as monitors, keyboards, pointing devices, etc., which communicate with communication infrastructure 506 through user input/output interface(s) 502.

The computer system 500 also includes a main or primary memory 508, such as a random-access memory (RAM) to provide an example. The main memory 508 can include one or more levels of cache. The main memory 508 has stored therein control logic (i.e., computer software) and/or data, such as the textual translating tool 202, the keyword routing tool 204, the direct command tool 206, the indirect command tool 208, and the searching tool 210 as described above in FIG. 2 and/or the tuning command tool 302, the media play command tool 304, and the generic command tool 306 as described above in FIG. 3.

The computer system 500 can also include one or more secondary storage devices or memory 510 to store the textual translating tool 202, the keyword routing tool 204, the direct command tool 206, the indirect command tool 208, and the searching tool 210 as described above in FIG. 2 and/or the tuning command tool 302, the media play command tool 304, and the generic command tool 306 as described above in FIG. 3 to provide some examples. The one or more secondary storage devices or memory 510 can include, for example, a hard disk drive 512 and/or a removable storage device or drive 514. The removable storage drive 514 may be a floppy disk drive, a magnetic tape drive, a compact disk drive, an optical storage device, tape backup device, and/or any other storage device/drive. The removable storage drive 514 may interact with a removable storage unit 518. The removable storage unit 518 includes a computer usable or readable storage device having stored thereon computer software (control logic) and/or data. The removable storage unit 518 may be a floppy disk, magnetic tape, compact disk, DVD, optical storage disk, and/any other computer data storage device. The removable storage drive 514 reads from and/or writes to removable storage unit 518 in a well-known manner.

According to an exemplary embodiment, the one or more secondary storage devices or memory 510 may include other means, instrumentalities or other approaches for allowing computer programs and/or other instructions and/or data to be accessed by computer system 500. Such means, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

The computer system 500 may further include a communication or network interface 524. The communication or network interface 524 enables the computer system 500 to communicate and interact with any combination of remote devices, remote networks, remote entities, etc. (individually and collectively referenced by reference number 528). For example, the communication or network interface 524 may allow the computer system 500 to communicate with the remote devices 528 over a communications path 526, which may be wired and/or wireless, and which may include any combination of LANs, WANs, the Internet, etc. Control logic and/or data may be transmitted to and from the computer system 500 via communication path 526.

In an embodiment, a tangible apparatus or article of manufacture comprising a tangible computer useable or readable medium having control logic (software) stored thereon is also referred to herein as a computer program product or program storage device. This includes, but is not limited to, the computer system 500, the main memory 508, the secondary memory 510, and the removable storage units 518 and 522, as well as tangible articles of manufacture embodying any combination of the foregoing. Such control logic, that when executed by one or more data processing devices (such as computer system 500), causes such data processing devices to operate as described herein.

Based on the teachings contained in this disclosure, it will be apparent to persons skilled in the relevant art(s) how to make and use the invention using data processing devices, computer systems and/or computer architectures other than that shown in FIG. 5. In particular, embodiments may operate with software, hardware, and/or operating system implementations other than those described herein.

CONCLUSION

Although the embodiments of the disclosure described herein refer specifically, and by way of example, to cable modem systems, including cable modem termination systems and cable modems, it will be readily apparent to those skilled in the relevant art(s) that the disclosure is equally applicable to satellite systems, optical communication systems, telephone wire systems, home network systems, and/or any combination thereof. It will be readily apparent to those skilled in the relevant art(s) that the disclosure is applicable to any point-to-multipoint system.

The Detailed Description referred to accompanying figures to illustrate exemplary embodiments consistent with the disclosure. References in the disclosure to "an exemplary embodiment" indicates that the exemplary embodiment described can include a particular feature, structure, or characteristic, but every exemplary embodiment may not necessarily include the particular feature, structure, or characteristic. Moreover, such phrases are not necessarily referring to the same exemplary embodiment. Further, any feature, structure, or characteristic described in connection with an exemplary embodiment can be included, independently or in any combination, with features, structures, or characteristics of other exemplary embodiments whether or not explicitly described.

The Detailed Description is not meant to limiting. Rather, the scope of the disclosure is defined only in accordance with the following claims and their equivalents. It is to be appreciated that the Detailed Description section, and not the Abstract section, is intended to be used to interpret the claims. The Abstract section can set forth one or more, but not all exemplary embodiments, of the disclosure, and thus, are not intended to limit the disclosure and the following claims and their equivalents in any way.

The exemplary embodiments described within the disclosure have been provided for illustrative purposes and are not intended to be limiting. Other exemplary embodiments are possible, and modifications can be made to the exemplary embodiments while remaining within the spirit and scope of the disclosure. The disclosure has been described with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

Embodiments of the disclosure can be implemented in hardware, firmware, software, or any combination thereof. Embodiments of the disclosure can also be implemented as instructions stored on a machine-readable medium, which can be read and executed by one or more processors. A machine-readable medium can include any mechanism for storing or transmitting information in a form readable by a machine (e.g., a computing circuitry). For example, a machine-readable medium can include non-transitory machine-readable mediums such as read only memory (ROM); random access memory (RAM); magnetic disk storage media; optical storage media; flash memory devices; and others. As another example, the machine-readable medium can include transitory machine-readable medium such as electrical, optical, acoustical, or other forms of propagated signals (e.g., carrier waves, infrared signals, digital signals, etc.). Further, firmware, software, routines, instructions can be described herein as performing certain actions. However, it should be appreciated that such descriptions are merely for convenience and that such actions in fact result from computing devices, processors, controllers, or other devices executing the firmware, software, routines, instructions, etc.

The Detailed Description of the exemplary embodiments fully revealed the general nature of the disclosure that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

What is claimed is:

1. A method for a display control device, the method comprising:

receiving an audio voice command in an analog signal domain spoken by a user to the display control device to control a display device;

converting the audio voice command to a digital audio command in a digital signal domain, wherein the digital audio command includes one or more textual words;

categorizing the one or more textual words as being one or more indirect audio command textual words or being one or more direct audio command textual words;

searching a catalog of command words to determine whether one or more command words from among the catalog of command words match the one or more indirect audio command textual words, in response to the one or more textual words as being the one or more indirect audio command textual words;

determining, in response that none of the one or more command words match the one or more indirect audio command textual words, a digital electrical command by:

analyzing the one or more indirect audio command textual words to determine a grammatical metric for the one or more indirect audio command textual words, performing a keyword search on the one or more indirect audio command textual words to identify the one or more command words when the grammatical metric is less than or equal to a search threshold, performing a natural language search on the one or more indirect audio command textual words to identify the one or more command words when the grammatical metric is greater than the search threshold, and determining the digital electrical command corresponding to the one or more command words for the one or more indirect audio command textual words to control the display device; and transmitting the digital audio command to a server, wherein the digital audio command is transformed into the digital electrical command to control the display device.

2. The method of claim 1, wherein the one or more direct audio command textual words comprise:
"volume up;" "volume
down;" "channel
up;" "channel
down;" "closed-captioning
on;" or
"closed-captioning off".

3. The method of claim 1, wherein the one or more indirect audio command textual words comprise:
"watch <movie name>;" "watch
<programming channel name>;" "play
<application name>;" or
"search <search term>".

4. The method of claim 1, wherein in response to the one or more textual words being categorized as the one or more indirect audio command textual words, the digital electrical command is determined based on the one or more command words that match the one or more indirect audio command textual words identified by a textual search of the catalog of command words.

5. The method of claim 1, wherein
in response to the one or more textual words being categorized as the one or more direct audio command textual words, the digital electrical command is determined based on the one or more command words that match the one or more direct audio command textual words identified by a textual search of the catalog of command words.

6. The method of claim 1, wherein the grammatical metric is representative of a number of elemental concepts within the one or more indirect audio command textual words, or representative of a number of elemental concepts within the audio voice command.

7. The method of claim 1, wherein the transmitting the digital audio command to the server further comprises transmitting an identifying information of the display control device or an identifying information of the display device with the digital audio command.

8. The method of claim 1, wherein the catalog of command words comprises a list of command words, each command word from among the list of command words being associated to a corresponding electrical command from among a plurality of electrical commands to control the display device.

9. The method of claim 1, wherein the display control device and the display device are integrated into one device.

10. A method for a display control device, comprising:
receiving an audio voice command in an analog signal domain spoken by a user to the display control device to control a display device;
converting the audio voice command to a digital audio command in a digital signal domain, wherein the digital audio command includes one or more textual words;
categorizing the one or more textual words as being one or more indirect audio command textual words or being one or more direct audio command textual words;
performing or causing to perform a textual search of a catalog of command words for the one or more textual words of the digital audio command to determine one or more command words matching the one or more textual words in response to the textual search of the catalog of command words determining the one or more command words successfully;

in response to the one or more textual words being categorized as the one or more indirect audio command textual words, and further in response to a failure to determine the one or more command words by the textual search of the catalog of command words, determining the one or more command words by:
analyzing the one or more indirect audio command textual words to determine a grammatical metric for the one or more indirect audio command textual words;
performing a keyword search on the one or more indirect audio command textual words to identify the one or more command words when the grammatical metric is less than or equal to a search threshold;
performing a natural language search on the one or more indirect audio command textual words to identify the one or more command words when the grammatical metric is greater than the search threshold; and
determining the digital electrical command corresponding to the one or more identified command words for the one or more indirect audio command textual words to control the display device; and transmitting the digital audio command to a server.

11. The method of claim 10, wherein the one or more direct audio command textual words comprise:
"volume up;" "volume
down;" "channel
up;" "channel
down;" "closed-captioning
on;" or
"closed-captioning off".

12. The method of claim 10, wherein the one or more indirect audio command textual words comprise:
"watch <movie name>;" "watch
<programming channel name>;" "play
<application name>;" or
"search <search term>".

13. The method of claim 10, wherein in response to the one or more textual words being categorized as the one or more direct audio command textual words, a digital electrical command is determined based on the one or more command words that match the one or more direct audio command textual words identified by the textual search of the catalog of command words.

14. The method of claim 10, wherein the grammatical metric is representative of a number of elemental concepts within the one or more indirect audio command textual words, or representative of a number of elemental concepts within an audio command, wherein the digital audio command is generated from the audio command.

15. The method of claim 10, wherein the performing or causing to perform the textual search of the catalog of command words for the one or more textual words of the digital audio command comprises transmitting the digital audio command to a server configured to perform the textual search of the catalog of command words.

16. The method of claim 15, wherein the transmitting the digital audio command to the server further comprises transmitting an identifying information of the display control device or an identifying information of the display device with the digital audio command.

17. The method of claim 10, wherein the catalog of command words comprises a list of command words, each command word from among the list of command words being associated to a corresponding electrical command from among a plurality of electrical commands to control the display device.

18. One or more non-transitory, computer-readable media having instructions that, when executed, cause a display control device to perform operations including:
    receiving an audio voice command in an analog signal domain spoken by a user to the display control device to control a display device;
    converting the audio voice command to a digital audio command in a digital signal domain, wherein the digital audio command includes one or more textual words;
    categorizing the one or more textual words as being one or more indirect audio command textual words or being one or more direct audio command textual words;
    searching a catalog of command words to determine whether one or more command words from among the catalog of command words match the one or more indirect audio command textual words, in response to the one or more textual words as being the one or more indirect audio command textual words;
    determining, in response that none of the one or more command words match the one or more indirect audio command textual words, a digital electrical command by:
        analyzing the one or more indirect audio command textual words to determine a grammatical metric for the one or more indirect audio command textual words,
        performing a keyword search on the one or more indirect audio command textual words to identify the one or more command words when the grammatical metric is less than or equal to a search threshold,
        performing a natural language search on the one or more indirect audio command textual words to identify the one or more command words when the grammatical metric is greater than the search threshold, and
        determining the digital electrical command corresponding to the one or more command words for the one or more indirect audio command textual words to control the display device; and
    transmitting the digital audio command to a server configured to transform the digital audio command into the digital electrical command to control the display device.

19. The method of claim 10, wherein the digital audio command is transformed into a digital electrical command to control the display device.

20. The one or more non-transitory, computer-readable media of claim 18, wherein the one or more direct audio command textual words comprise:
    "volume up;" "volume down;" "channel up;" "channel down;" "closed-captioning on;" or "closed-captioning off".

* * * * *